Dec. 20, 1927.  1,653,506
H. P. OKIE
APPARATUS FOR TREATING BEANS AND OTHER PULSE FOODS
Filed April 28, 1927   2 Sheets-Sheet 2
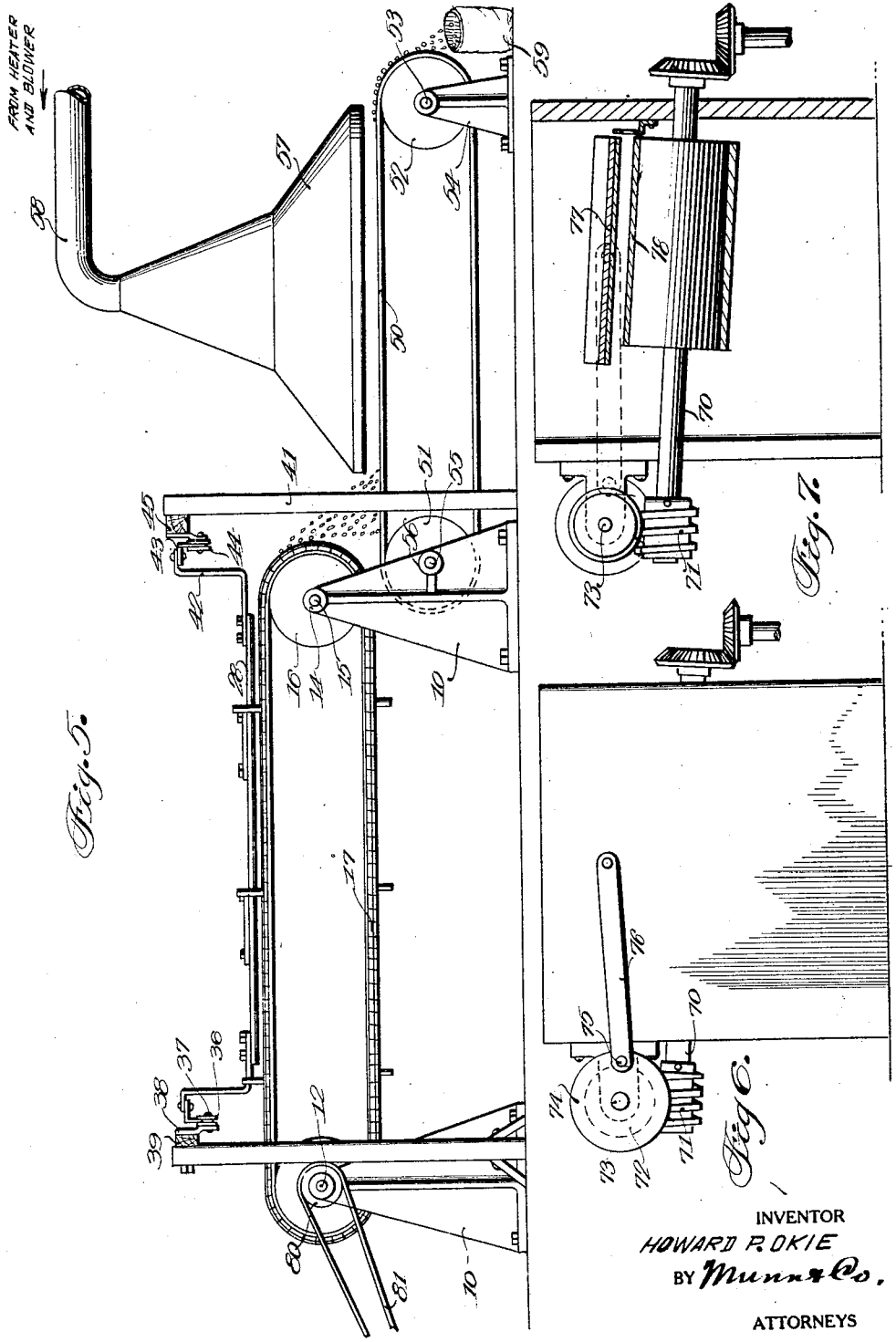
INVENTOR
HOWARD P. OKIE
BY Munn & Co.
ATTORNEYS Patented Dec. 20, 1927.

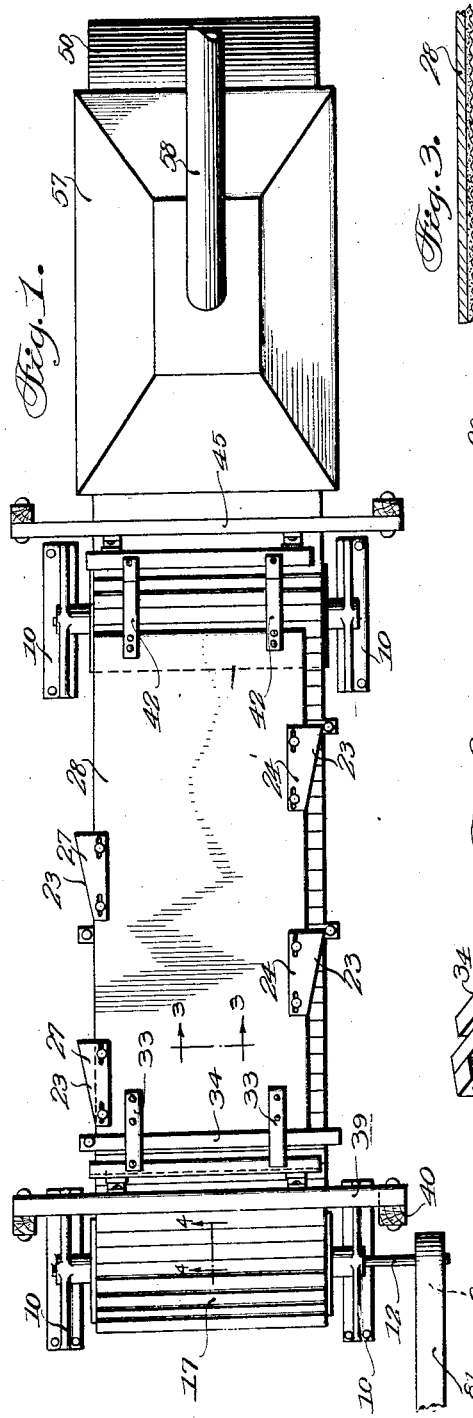

1,653,506

UNITED STATES PATENT OFFICE.

HOWARD PILCHER OKIE, OF WASHINGTON, DISTRICT OF COLUMBIA.

APPARATUS FOR TREATING BEANS AND OTHER PULSE FOODS.

Application filed April 28, 1927. Serial No. 187,264.

This invention relates to a device for the treatment of beans. An object of the invention is the provision of a machine which will readily remove the hulls from the beans without crushing or distorting the beans in any manner so that the beans may not only be readily cooked but they will be more digestible.

A further object of the invention is the provision of a machine for removing the hulls of beans and in which a travelling carrier is moved at right angles to that of an oscillating member which is automatically actuated through the movement of the travelling carrier, and in which both the travelling carrier and oscillating member have corrugated surfaces in operative relation for cooperating to cause the removal of the hulls.

A still further object of the invention is the provision of a machine for removing the hulls of beans after the beans have been steeped or soaked in water for a predetermined length of time, after which the beans are subjected to a percussion process between two moving surfaces whereby the hulls are not only removed but are deflected and discharged from the normal path of travel of the beans through the machine.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 1 is a plan view of a machine constructed according to the principles of my invention, Figure 2 is a fragmentary view in perspective of one end of the machine, Figure 3 is a transverse vertical section taken along the line 3—3 of Fig. 1, Figure 4 is a fragmentary vertical section taken along the line 4—4 of Fig. 1, Figure 5 is a longitudinal side view in elevation of the device shown in Fig. 1, Figure 6 is an end view showing a modified form of operating means for reciprocating one of the hull removing elements, and Figure 7 is a vertical section through the modified form shown in Fig. 6.

Referring more particularly to the drawings, 10 designates spaced standards at the opposite ends of the machine for supporting the driven drum 11 mounted on an axle 12, said axle being mounted in bearings 13 at the upper end of the standards 10. A second pair of standards are located at the opposite end of the machine provided with bearings 14 in which are mounted the opposite ends of a shaft 15 which carries an idling drum 16.

A travelling carrier generally designated by the numeral 17 is composed of an endless member 18 formed of any flexible material to which are secured transverse slats 19. As shown more particularly in Fig. 4, the outer surface of each transverse slat is covered by some resilient material 20 which may be formed of rubber or any suitable composition and provided with a plurality of corrugations for a purpose which will be presently described. It will be noted, however, that when the travelling carrier is located in a horizontal plane that the adjacent edges of the slats are in contact with each other. However, when the travelling carrier passes around the drum 11 or drum 16, the slats will tend to move apart, more particularly at their outer edges to provide a triangular space between.

Certain of the slats are extended laterally from opposite side edges 21 of the travelling carirer 17 and are provided with upstanding lugs 22 and 25 adapted to engage inclined edges 23 and 25 of spaced plates 24 and 27 respectively. These extended slats and lugs 22 are disposed in spaced relation along the side edges of the travelling carrier 17 in such a manner that they will coact with the inclined faces of the plates 24 at one side of the carrier, while the lugs 25 will coact with the inclined faces 26 of plates 27 located at an opposite side edge of the carrier for causing lateral shifting movement of a member 28 which moves at right angles to the path of movement of the travelling carrier 17. It will be noted that the plates 24 and 27 each have a pair of spaced elongated slots 29 adapted to receive thumb screws 30 which are mounted in the member 28 whereby the plates 24 and 27 may be adjusted so that they will engage the lugs 22 and 25 at proper intervals for an effective oscillating motion of the member 28.

The member 28 is supported by means of straps or hangers 33 which are rigidly secured to a rail 34 having a flange 35 resting on rollers 36 supported on axles 37 which are in turn carried by brackets 38 secured to a transverse beam 39. The beam 39 is supported by means of posts 40 located at opposite sides of the travelling carrier adjacent the drum 11.

A similar element supporting the opposite ends of the oscillating member 28 is provided adjacent the idling drum 16 and is supported upon posts 41 with hangers 42 rising from the inner end of the oscillating member 28 to which is secured a rail 43 riding in grooved rollers 44 which are supported by a transverse beam 45 secured to the upper end of the posts 41.

Both the oscillating member 28 and the travelling carrier 17 are inclined at an angle to the horizontal so that moisture which has been forced or which is removed from the beans during treatment between the equally spaced member 28 and the travelling carrier 17 will travel by gravity to the edge of the travelling carrier and may be collected in any suitable manner.

A travelling carrier 50 is driven by a drum 51 and moves over an idling drum 52 which is opposite to the drum 51. A drum 52 carried by a shaft 53 is mounted in bearings in the upper ends of a pair of spaced standards 54. The drum 51 is revolved through a shaft 55 which is carried in bearings 56 formed on the inner standards 10.

A hood 57 is located above the travelling carrier 50 and a blast of heated air is forced through a pipe 58 and through hood 57 on to the beans which have been discharged from the travelling carrier 17 onto the travelling carrier 50 whereby the hulls and moisture are removed from the beans before they are discharged into the container 59.

In the modified form shown in Figs. 6 and 7 a driven shaft 70 is provided with a worm 71 meshing with a worm gear 72 on a shaft 73. The shaft 73 has rigid therewith a disk 74 having an eccentric pin 75 to which is connected a link 76 the other end of the link being connected to a member 77 which is adapted to be reciprocated over the top of a travelling carrier 78. The travelling carrier 78 is identical in all respects to the travelling carrier 17 while the member 77 is also identical with the member 28 and only the means for reciprocating the respective members is varied in order to disclose other methods of causing the vibratory motion of the member 28 which cooperates with the travelling carrier 17 to remove the hulls from the beans.

The shaft 12 is driven through a pulley 80 over which is trained a driving belt 81. This belt, as will be appreciated, is driven from some suitable source, not shown.

The operation of my device is as follows:

It will be noted that the outer end of the member 28 terminates short of the length of the machine which covers sufficient space, as shown more particularly at 85, for the reception of the beans which have been soaked preparatory to the treatment for removing the hulls. Since the belt 85 is travelling in the direction indicated by the arrow in Fig. 2, the beans will be drawn in between the oscillating member 28 and by the travelling carrier. Since the member 28 is moved continuously in opposite directions and transversely of the movement of the travelling carrier 17, the beans will be agitated and will be rubbed between the corrugated rubber strips 20 of the travelling carrier 17 and the corrugated rubbing face 86 formed at the inner face of the member 28 whereby the hulls will be gradually broken and removed from the beans. Any moisture which may have been carried by the beans through the travelling carrier 17 will run off from the travelling carrier since the travelling carrier is inclined at a slight angle to the horizontal or one edge is lower than the other edge, so that all moisture will be drained from the travelling carrier. The vibratory motion of the member 28 in conjunction with the movement of the travelling carrier 17 which impels the beans forwardly and in opposition to the movement of the member 28 causes the removal of the hulls so that when the beans are discharged from the inner end of the travelling carrier 17 and on the travelling carrier 50 the stream of air from the hood 57 will force the hulls of the beans from the travelling carrier 50 and also the moisture. When the beans are discharged into the container 55 the hulls and moisture will have been removed and the beans are now ready for cooking or shipping in cartons as the case may be.

The beans may be broken into small particles to facilitate cooking or a flour may be manufactured from the beans by any well known milling process, and such flour differs from the well known flours on the market due to the fact that it is an uncooked product from which the hulls have been removed by the mechanism described above. The product is one in which a high protein food content is had and from which all the indigestible elements have been removed.

I claim:—

1. A device of the character described comprising an endless carrier, means for moving said carrier, a member having a corrugated surface spaced from the endless carrier, means on the member and cooperating means on the carrier for causing reciprocation of said member whereby beans placed on the carrier are agitated between said members and carrier to remove the hulls.

2. A device for removing the hulls from beans comprising an endless belt having an active face corrugated transversely of the endless belt, said belt having spaced lateral projections, lugs upstanding from the projections, a cooperating surface spaced from the endless belt and provided with laterally projecting cam members adapted to be engaged alternately by the lugs at opposite sides of the belt for causing reciprocation of the surface, and for agitating and rubbing the beans between the surface and the endless carrier.

3. A device for removing the hulls from beans comprising an endless belt having an active face corrugated transversely of the endless belt, said belt having spaced lateral projections, lugs upstanding from the projections, a cooperating surface spaced from the endless belt and provided with laterally projecting cam members adapted to be engaged alternately by the lugs at opposite sides of the belt for causing reciprocation of the surface, and for agitating and rubbing the beans between the surface and the endless carrier, and means for slidably mounting the surface above the carrier.

4. A device for removing the hulls from beans comprising an endless belt having an active face corrugated transversely of the endless belt, said belt having spaced lateral projections, lugs upstanding from the projections, a cooperating surface spaced from the endless belt and provided with laterally projecting cam members adapted to be engaged alternately by the lugs at opposite sides of the belt for causing reciprocation of the surface, and for agitating and rubbing the beans between the surface and the endless carrier, the endless belt having one side edge lower than the other edge whereby moisture from the beans will flow by gravity from the endless belt.

5. A device for removing the hulls from beans comprising an endless belt having an active face corrugated transversely of the endless belt, said belt having spaced lateral projections, lugs upstanding from the projections, a cooperating surface spaced from the endless belt and provided with laterally projecting cam members adapted to be engaged alternately by the lugs at opposite sides of the belt for causing reciprocation of the surface, and for agitating and rubbing the beans between the surface and the endless carrier, means for adjusting the cam members longitudinally of the endless belt.

6. A device for removing the hulls of beans comprising an endless belt, means for moving said belt, a plane surface spaced above a section of the endless belt, a frame embracing the endless belt provided with rollers, hangers connected with the opposite end of the surface and provided with a track movable on the rollers whereby the surface is movable transversely of the endless belt, plates adjustably mounted on the surface and projecting in spaced relation laterally from the surface, said plates having one side edge inclined at an acute angle to an edge of the surface, lugs carried by the opposite side edges of the endless belt and adapted to engage the inclined edge to cause the alternate reciprocation of the surface transversely of the moving belt.

HOWARD PILCHER OKIE.

CERTIFICATE OF CORRECTION.

Patent No. 1,653,506.  Granted December 20, 1927,

It is hereby certified that the name of the patentee in the above numbered patent was erroneously written and printed as Howard Pilcher Okie, whereas said name should have been written and printed as "Howard Pitcher Okie; and that the said Letters Patent should be read with this correction therein that the same may conform to the record of the case in the Patent Office.

Signed and sealed this 6th day of March, A. D. 1928.

Seal .

M. J. Moore,
Acting Commissioner of Patents.